United States Patent [19]
Lenhart et al.

[11] Patent Number: 6,019,313
[45] Date of Patent: Feb. 1, 2000

[54] INSTALLATION FOR MOUNTING AN ENGINE ON A DECK AND FOR CONNECTING ITS OUTPUT SHAFT TO AT LEAST ONE DRIVEN MECHANISM

[75] Inventors: François Robert Lenhart, La Fare les Oliviers; Daniel Chaniot, Marignane, both of France

[73] Assignee: Eurocopter, Marignane Cedex, France

[21] Appl. No.: 08/978,049

[22] Filed: Nov. 25, 1997

[30] Foreign Application Priority Data

Nov. 29, 1996 [FR] France .................................. 96 14683

[51] Int. Cl.[7] ........................ B64D 35/00; B64C 27/00; F16M 13/00; F02C 7/20
[52] U.S. Cl. ...................... 244/60; 244/17.19; 248/554; 60/39.31
[58] Field of Search ................... 244/60, 54, 55, 244/17.19; 248/554, 555, 556, 557; 180/383, 384; 60/39.31

[56] References Cited

U.S. PATENT DOCUMENTS

| | | |
|---|---|---|
| 1,397,304 | 11/1921 | White ...................................... 180/383 |
| 2,084,214 | 5/1937 | Anibal ...................................... 180/384 |
| 3,002,710 | 3/1961 | Marchetti . |
| 3,208,217 | 9/1965 | Sonder .................................... 60/39.31 |
| 3,362,255 | 1/1968 | De Rocca et al. .................... 244/17.19 |
| 4,037,404 | 7/1977 | Bougain ..................................... 60/223 |
| 4,274,510 | 6/1981 | Mouille et al. ............................ 244/54 |
| 4,412,774 | 11/1983 | Legrand et al. ......................... 414/589 |
| 4,501,973 | 2/1985 | Fenemore et al. ..................... 60/39.31 |
| 4,899,959 | 2/1990 | Weiler ....................................... 244/54 |
| 5,190,246 | 3/1993 | Mac Conochie .......................... 244/54 |
| 5,271,217 | 12/1993 | Knuijt .................................... 60/39.31 |

FOREIGN PATENT DOCUMENTS 0 282 784  9/1988  European Pat. Off. .

Primary Examiner—Theresa M. Wesson
Attorney, Agent, or Firm—Henderson & Sturm

[57] ABSTRACT

An installation for connecting the output shaft of the engine and the input shaft of the transmission box together including a transmission shaft having a certain amount of flexural flexibility and including splines at one of its ends. The splined end being designed to be a sliding fit in a corresponding splined hub of the engine. Attaching the engine to the deck actualized by a system for articulated attachment which includes stand legs and rails fixed to the deck parallel to the shafts. The legs can slide with the engine after tilting.

10 Claims, 7 Drawing Sheets

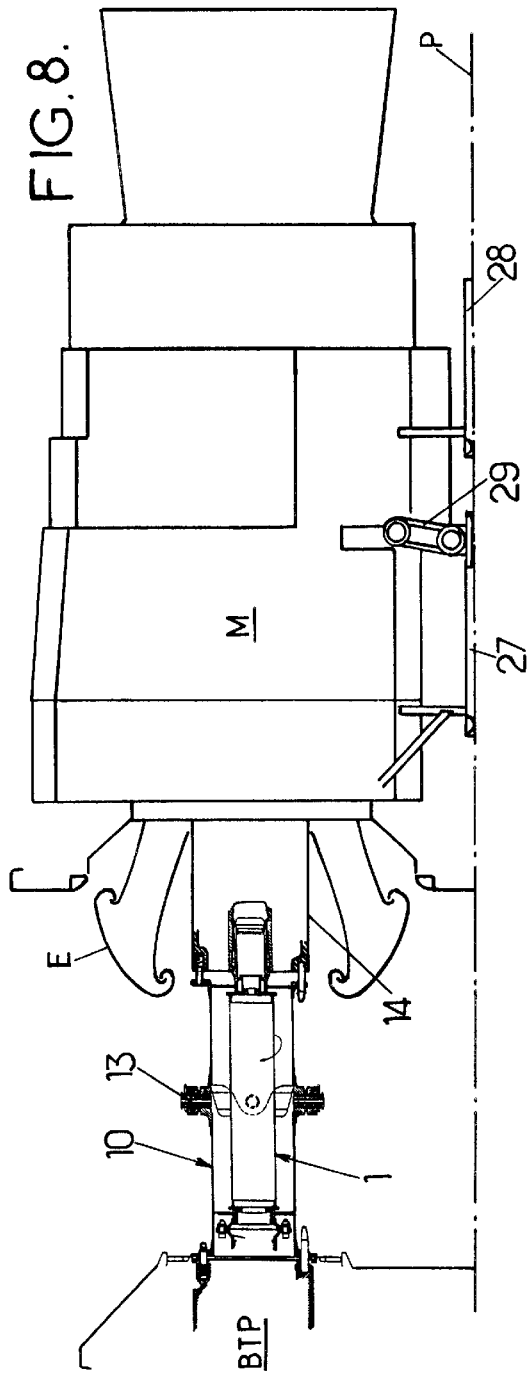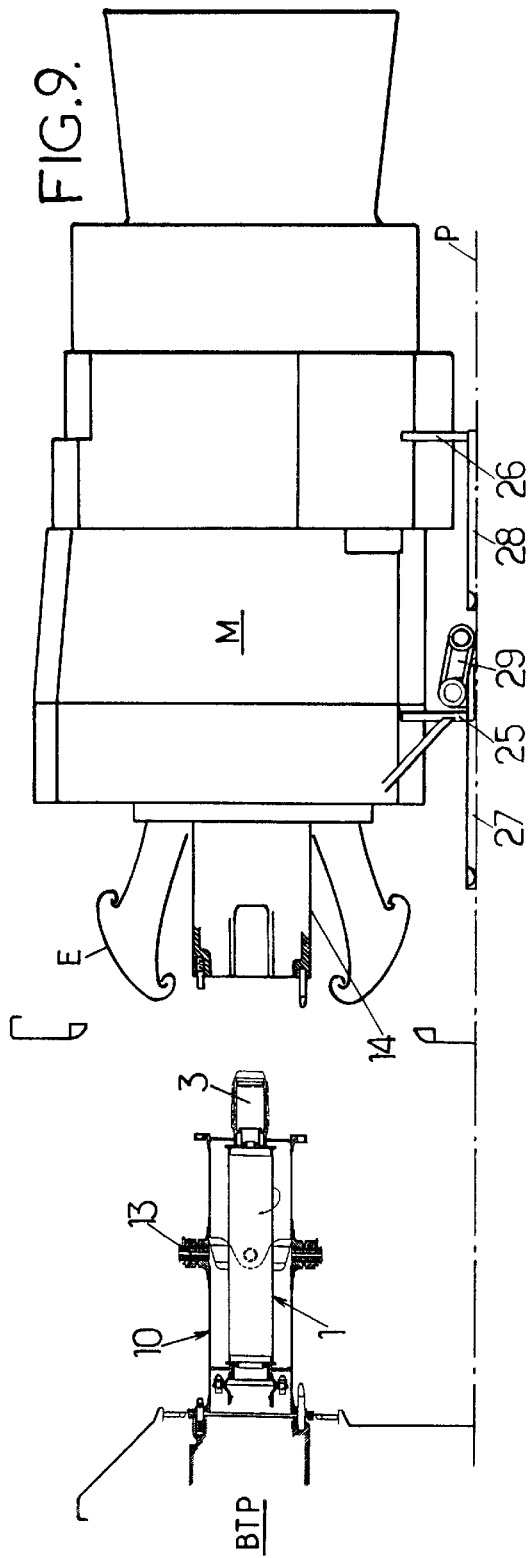

ડ6,019,313

INSTALLATION FOR MOUNTING AN ENGINE ON A DECK AND FOR CONNECTING ITS OUTPUT SHAFT TO AT LEAST ONE DRIVEN MECHANISM

The present invention relates to an installation for mounting an engine on a deck, and for connecting its output shaft to at least one driven mechanism, this output shaft normally being connected to at least one input shaft of the said mechanism, the installation for this comprising means of connecting the said output and input shafts together, and means of attaching the said engine to the said deck.

The said mechanism, which is driven by the engine, may for example be a gearbox or transmission box. The invention relates more particularly to installations in which the engine and the mechanism concerned are of significant size and weight. With this in mind, it is more specifically still targeted at turbine engines of helicopters, which engines drive, among other things, a transmission box known as the "main transmission box" (BTP) for driving the main rotor, a mechanism whose size and weight are therefore relatively significant. This mechanism may also experience movement in three axes in space without this in any way detracting from the correct operation of the engine—BTP connection.

Under these conditions, complex problems of dismantling, disconnecting, handling and re-assembly arise when inspection, maintenance or repair operations need to be performed either on the engine or on the driven mechanism. In helicopters, these operations are expensive and lengthy, and this keeps the aircraft out of service for long periods of time, even just for the operations of removing and refitting the engine or the main transmission box.

The object of the present invention is to eliminate these drawbacks by making these operations easier and rendering them far quicker and therefore less expensive in terms of hardware, labour and the amount of time the aircraft are out of service and grounded, this being something which is particularly important as far as helicopters are concerned.

For this, an installation of the general type defined at the beginning is, according to the present invention, mainly characterized in that the said connection means comprise a transmission shaft which has a certain amount of flexural flexibility and has splines at one of its ends at least, this splined end being designed to be a sliding fit in a corresponding splined hub of the engine and/or of the said mechanism, and in that the said attachment means comprise legs for standing the said engine on the deck, a system for articulated attachment between the said engine and the said deck, (engine-support link rods) and rails fixed to the deck parallel to the said shafts and on which the said legs can slide with the engine after tilting thanks to the said system of articulated attachment. The stand legs act as support only when the engine is in the tilted position, that is to say when the engine is no longer in its operating position. Under normal engine operation, it is essential that the stand legs should have enough clearance with respect to the structure that the movements of the mechanism (allowing for movements of the BTP) are permitted.

In this way, when intervention on the main transmission box of a helicopter is required, for example, it will be easy to uncouple the output shaft of the engine from the input shaft of the main transmission box, to tilt then slide the engine along its rails to move it away from the main transmission box, then to carry out the desired intervention on the engine and/or the main transmission box, these operations, which are made possible by the relative flexibility of the transmission shaft, not necessarily needing the engine to be disconnected from the pipes and circuits its needs for running. Re-assembly may be carried out with equal ease.

To give the transmission shaft the desired flexibility, an installation of this kind may also be characterized in that the said transmission shaft has a rigid central section, one end of which is connected to the aforementioned splined end and the other end of which is connected to a flanged end section that can be fixed to the corresponding flange of a flanged hub of the said mechanism or of the engine, and in that at least one flexible coupling device—of the flector or similar type—is inserted between one end of the said rigid central section of the said transmission shaft and its splined end and/or its flanged end section.

As a preference, there will be two flexible coupling devices on such a shaft, one near each end of the shaft. From one end to the other, a transmission shaft of this kind will therefore theoretically consist of: a flanged end section, a first flexible coupling device, the rigid central section (which for example is tubular), a second flexible coupling device and finally the splined end; if the latter is engaged in a splined hub of the output shaft of the engine, the flanged end section will be fixed (for example by bolts) to a flanged hub of the input shaft of the mechanism (main transmission box or some other), or vice versa, both arrangements being possible depending on whether the splined hub is on the engine output or on the mechanism input.

In installations in which a stationary and projecting protective flared tube surrounds the end of the output shafts of the engine and of the input shaft of the mechanism, it may also be advantageous to envisage that these flared tubes are connected by an intermediate flared tube surrounding the said transmission shaft and fixed by its outer ends to the said stationary flared tubes, and that the said intermediate flared tube is made up of two flared half tubes, the internal ends of which are joined together by a cardan joint.

FIG. 7a of plate 6/7 of the appended drawings shows how equilibrium of the engine M, is achieved, the system of articulated attachment between this engine, which has a centre of gravity G, and the support structure DE, being depicted by attachment elements BD and CE, the cardan joint being situated at the point A where a moment and forces Fx, Fy, Fz along the three axes of the orthonormal reference frame Ox, Oy, Oz are exerted. The angle α between BD and DE on the one hand, and between CE and ED on the other hand, absolutely must be other than 90°. Forces Fy and Fz are exerted at the points B and C.

The point A is a cardan point which does not allow the engine to rotate about the axis Ox. If the engine wishes to move in the y-positive direction, the point B has a locus of radius DB carrying it towards a negative z, and the point C has a locus of radius EC carrying it towards a positive z. This type of simultaneous movement of the two points B and C is possible only by the engine rotating about the axis Ox. As the engine is prevented from rotating at the point A, it is therefore in stable equilibrium.

This contributes (in combination with the action of the cardan joint and of the system of articulated attachment which was mentioned earlier) to preventing the engine body being able to pivot with respect to the body of the mechanism about the axis of the transmission shaft, while at the same time allowing angular travel between the two flared half tubes which travel is of benefit especially during operations of fitting and removing the engine and/or the mechanism and also for avoiding stresses of the mechanism being passed onto the engine.

Consider, for example, the means of guiding or fixing an outer end of a flared half tube on the end of the corresponding stationary flared tube; it should be noted that these means could be of different types.

It could, for example, be envisaged for at least one of the said stationary flared tubes to have a set of guide spigots over which corresponding holes of a flange provided at the outer end of the corresponding flared half tube can engage, which flange may be fixed by screws to the end of the relevant stationary flared tube.

By way of alternative, it could be envisaged for at least one of the said stationary flared tubes to have a guide spigot and an axial bore for centring, in which an end centring device that projects from a flange provided at the outer end of the corresponding flared half tube can engage, which flange may, as before, be fixed by screws to the end of the relevant stationary flared tube.

All these arrangements will be better seen later.

As regards the means which were earlier termed the "means of attaching the said engine to the said deck", the invention will also explain special features, including the following.

It could especially be envisaged that the body of the engine has three stand legs, namely a central leg and two lateral legs spaced axially away from the first one, there therefore being three of the aforementioned rails, and that at least two of these rails, namely a central rail and at least one lateral rail are produced in the form of guiding slideways for the corresponding legs.

The engine can thus be perfectly guided axially after the shafts and flared tubes have been disconnected, for example for maintenance work.

As to the said system of articulated attachment (engine supports), it will preferably have at least two link rods which can be secured, by removable pins, between clevis mounts on the deck and corresponding clevis mounts on the body of the engine, these link rods being arranged laterally and directed at least approximately towards the axis of the engine and, when they occupy their normal static position, furthermore being inclined axially slightly towards the said mechanism.

Thanks to this last arrangement, pulling the engine back slightly having made the disconnections already mentioned will allow the link rods to pivot away from the mechanism and to transfer the engine onto its rails (bringing the three stand legs into operation).

All these arrangements will be better understood from reading the embodiments which will now be described by way of non-limiting examples with reference to the other figures of the appended drawing in which:

FIG. 1 shows one possible embodiment of a flexible transmission shaft that can be used in an installation according to the invention, in particular between a turbine engine and a main transmission box of a helicopter;

FIG. 2 likewise shows the possible embodiment of an intermediate flared tube for the engine/main transmission box connection;

FIGS. 8 and 9 are general arrangements of the same kind as FIG. 6, schematically showing the various phases in an engine-removal operation.

Figure 1:
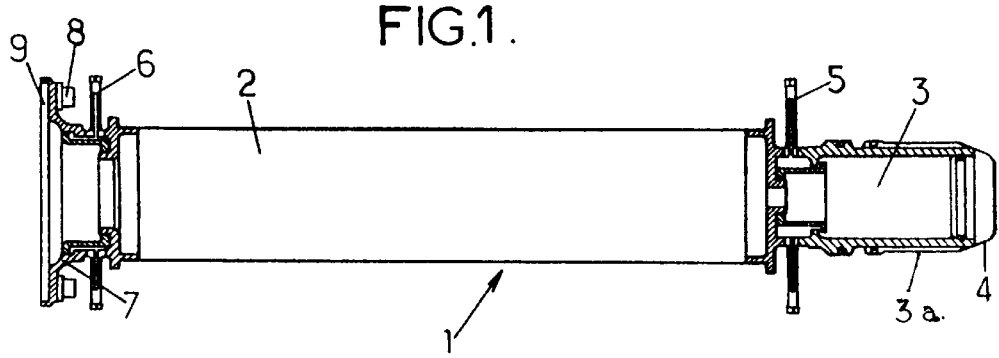

The transmission shaft depicted in FIG. 1, referenced overall as 1, has a rigid tubular central section 2, the splined end of which is referenced 3. This end has a chamfer 4 at its extremity, making its guidance in the interacting splined hub of the corresponding input or output shaft easier. The connection between the central section 2 and the end 3 having splines 3a is achieved using a flexible coupling device 5, for example of the "flector" or "bendix" type. Likewise, the other end of the central section 2 is connected by the same type of flexible coupling, referenced 6, to a flanged end section 7 which allows it to be connected, for example by bolts 8, to the flange 9 of a flanged hub of the input or output shaft to be connected.

Figure 2:
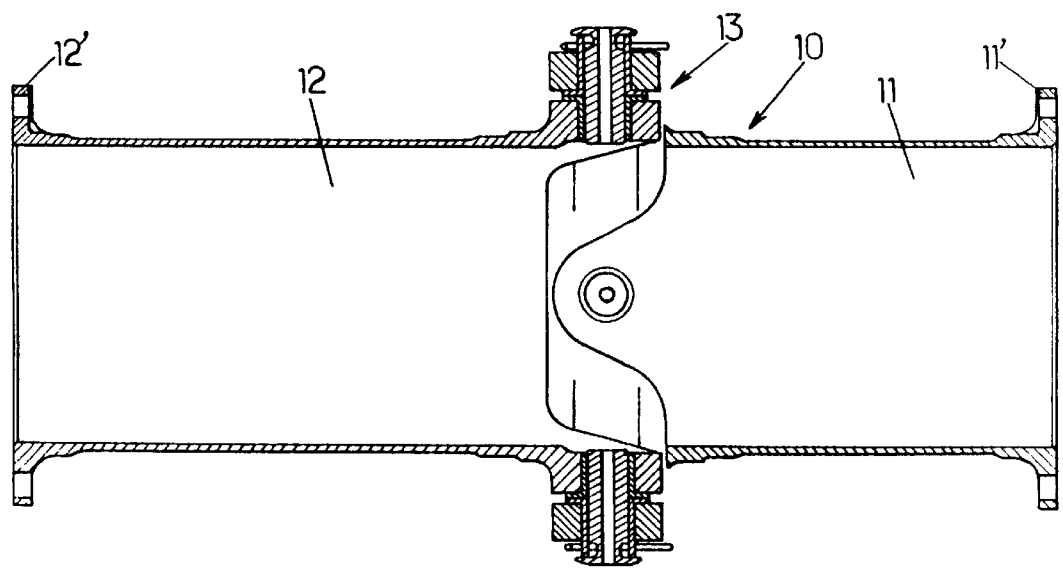

FIG. 2 for its part shows the possible embodiment of the intermediate flared tube, referenced overall as 10. This flared tube here consists of two flared half tubes 11, 12, the outer ends of which have attachment flanges 11', 12' and the inner ends of which are joined together by a cardan joint 13; one of its axes is horizontal, and the other is vertical.

Figure 3:
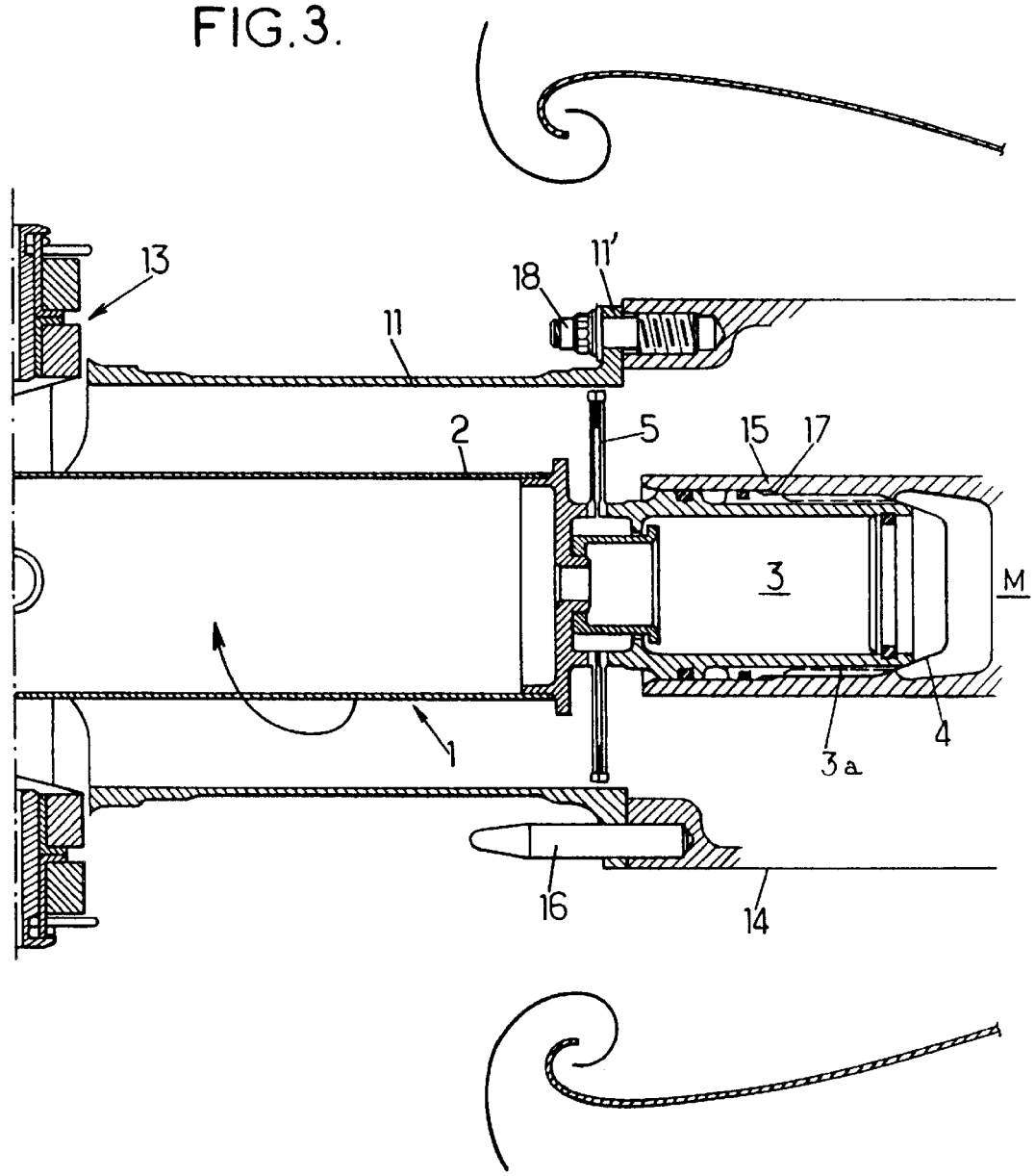
FIG. 3 shows, in a first alternative form, one possible way of attaching the transmission shaft and its corresponding flared half tube to the corresponding components of the engine.

In FIG. 3, the numeral 14 references the stationary and projecting flared tube protecting the output shaft of the engine, which has a splined hub depicted diagrammatically as 15. To make correct guidance of the splined end 3 of the transmission shaft in the splined hub 15 of the engine easier, the flared tube 14 has a set of guide spigots 16, for example three of these, over which corresponding holes of the flange 11' of the corresponding flared half tube 11 can thus engage; chamfers 17 are provided in the splined hub 15 to further improve guidance, by interacting with the chamfers 4 on the splined end 3. At the end of fitting, studs 18 allow the flange 11' to be tightened up against the end of the flared tube 14.

Figure 4:
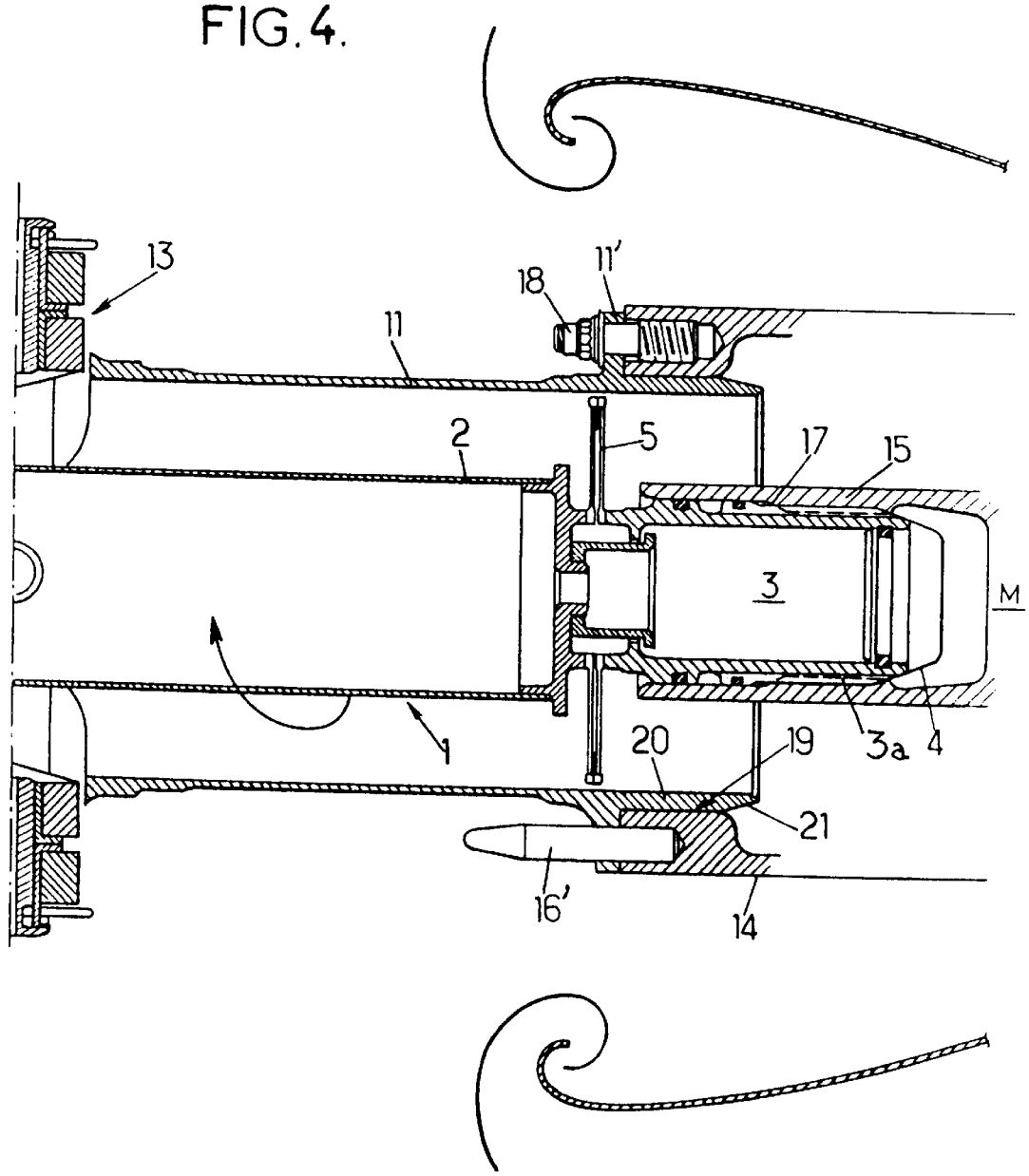
FIG. 4 shows a second alternative form of this method of attachment.

In the alternative form of FIG. 4, the flared tube 14 itself has an axial bore 19 capable of accommodating and of guiding during assembly, a centring device 20 of the flared half tube 11, this centring device, which is chamfered 21 at its end, projecting from the flange 11'. This being the case, it is possible to provide just one guide spigot 16' on the flared tube 14. It should be noted that the guide spigot 16' may be long enough that it enters the corresponding hole in the flange 11' before the centring device 20 enters the axial bore 19 in the flared tube 14. The other references in this figure denote the same components as in the previous figure, or similar components.

Figure 5:
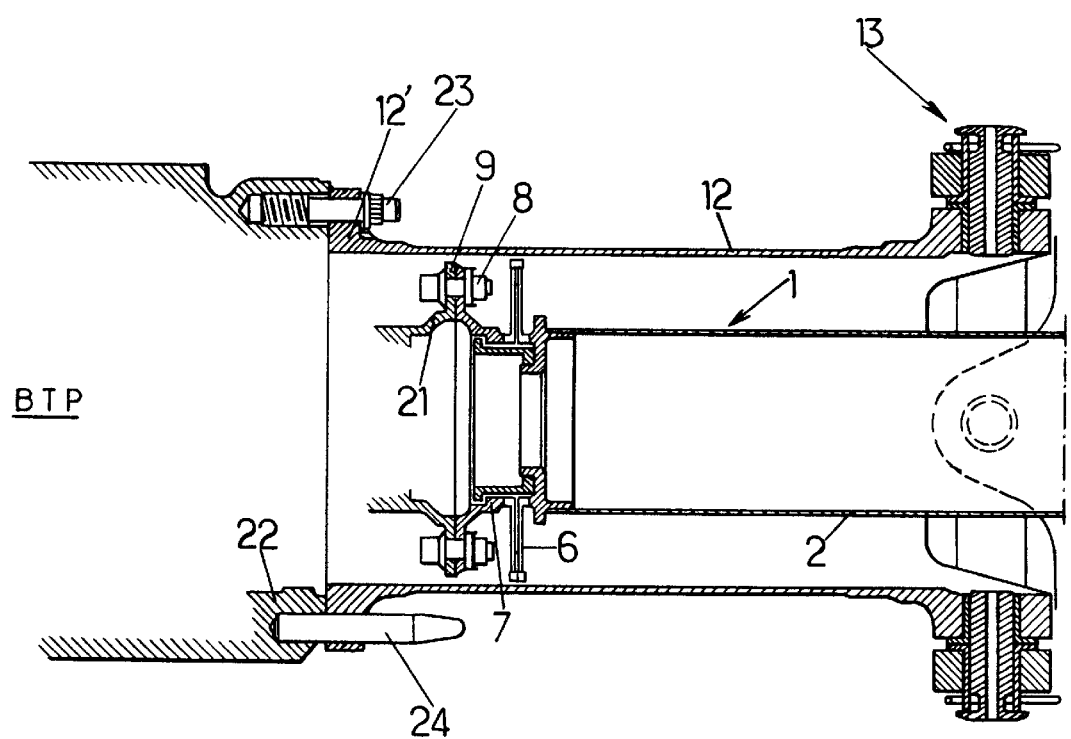
FIG. 5 shows a possible way of attaching the transmission shaft and the other flared half tube to the corresponding parts of the main transmission box.

FIG. 5 shows possible connections between, on the one hand, the transmission shaft 1 and a flanged hub 21 (see flange 9 mentioned earlier) of the input shaft of the main transmission box of the helicopter (or other driven mechanism) and, on the other hand, between the outer end of the flared half tube 12 and the end of the flared tube (sketched in as 22) of this input shaft of the main transmission box: the flanged end section 7 of the shaft 1 is fixed by bolts 8 to the flange 9 of the flanged hub 21 of the input shaft of the main transmission box (see also FIG. 1) and the flange 12' of the flared half tube 12 is fixed to the end of the flared tube 22 by a set of studs 23. To provide guidance during mounting, the flared tube 22 will preferably have several guide spigots 24 that can enter corresponding holes in the flange 12'.

Figure 6:
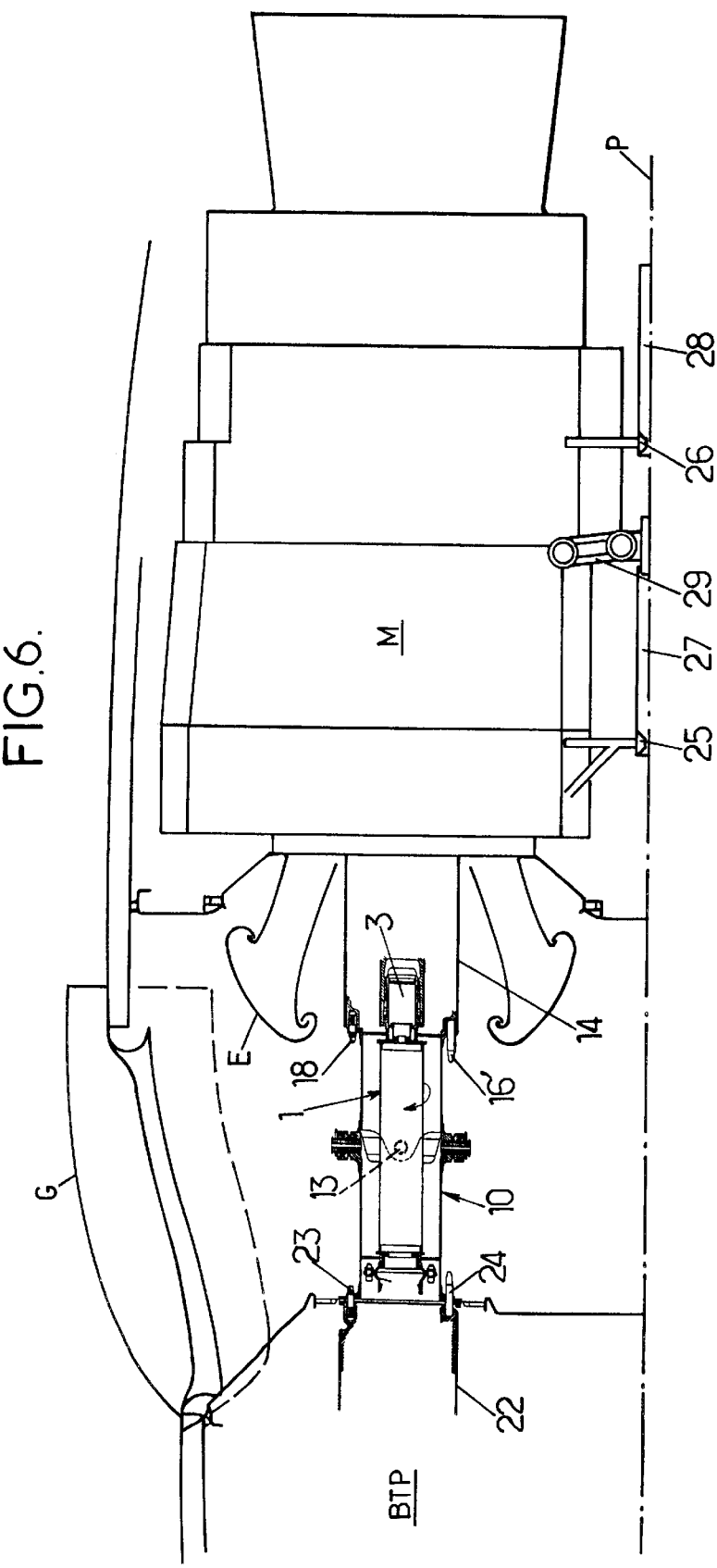
FIG. 6 is a general arrangement of an installation in accordance with the invention, as applied to attaching a helicopter engine to its main transmission box.

In the general arrangement in FIG. 6, the turbine engine of a helicopter has been referenced M, and its main transmission box has been denoted BTP. The turbine deck on which the turbine is mounted has been reference P; E denotes the engine air intakes and G denotes the air intake grille. Two of the three legs by means of which the engine can stand on the deck have been referenced as 25 and 26, and two of the three rails fixed to this deck and intended to take these legs when the engine M is slid axially have been referenced 27 and 28. Finally, one of the two inclined connecting rods that connect the engine to the deck P has been referenced as 29, all these components, together with a cradle 30 for the engine stand legs, together form what was earlier termed the "means of attaching the engine to the deck". The other references correspond to those in the earlier figures.

Figure 7:
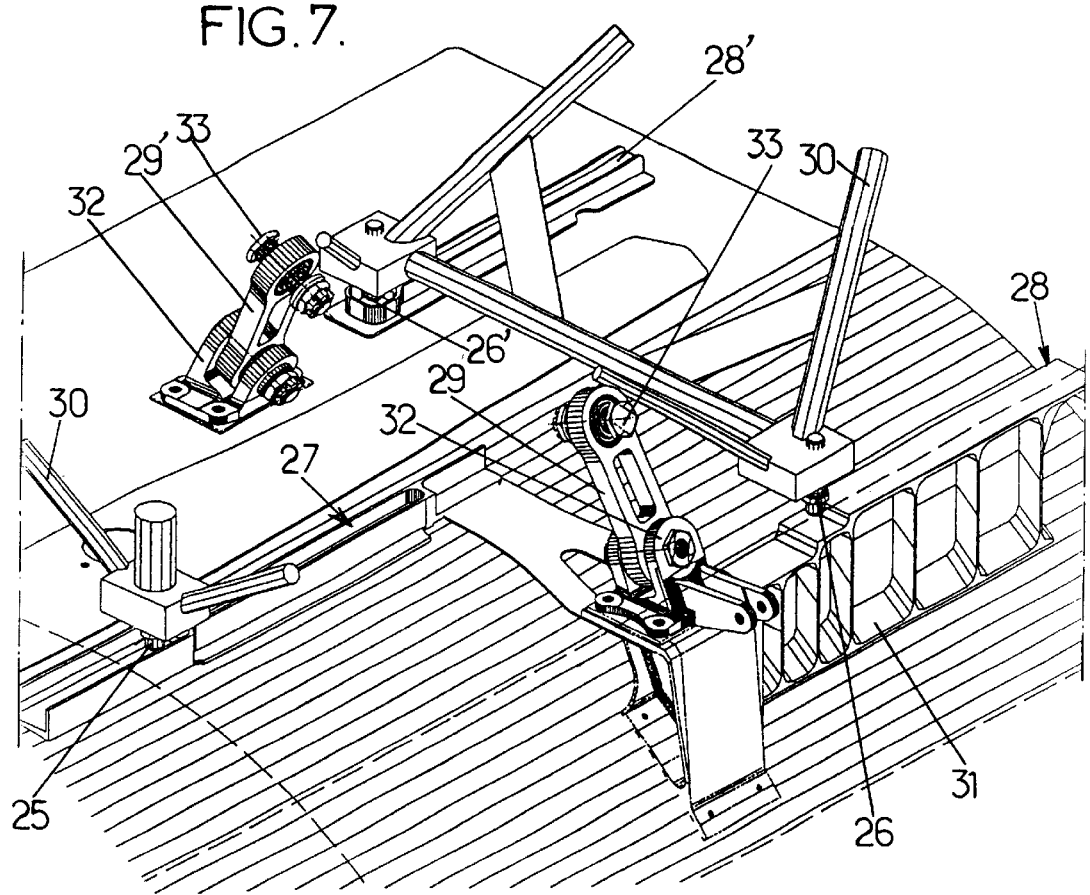
FIG. 7 is a part perspective view showing the means of attaching the engine to the deck.
Figure 7A:
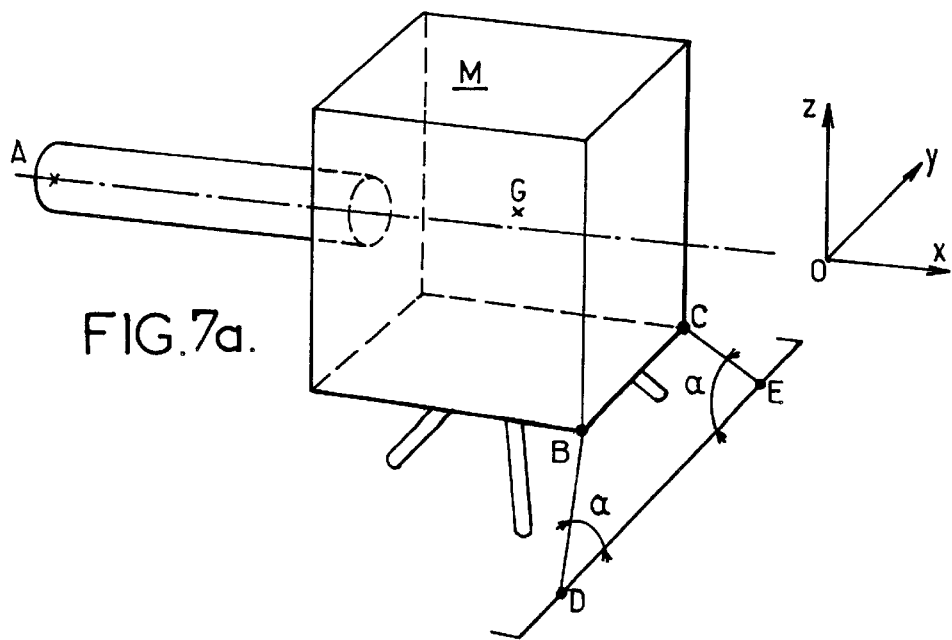
FIG. 7a is a diagrammatic view showing how equilibrium of the engine is achieved.

The aforementioned components of the attachment means are better seen in the figure in perspective that is FIG. 7. The three legs 25, 26 and 26' (which have height-adjustment means), the three rails 27, 28 and 28', the two inclined link rods 29 and 29' and the cradle 30 of the engine M can be seen in this figure.

The central rail 27 is made in the form of a guiding slideway for the central front leg 25, as is the lateral rail 28' for the rear lateral leg 26'. As the engine M can thus be perfectly guided as it slides axially, the third rail, namely the other lateral rail 28, which is intended to support the other rear lateral leg 26, can be a flat rail. To keep them level with the central rail 27, the lateral rails are supported by the deck P via frame members, one of which has been depicted as 31 for the rail 28.

In FIG. 7, the two link rods 29, 29' are depicted in the position they occupy when the engine M is in its position for normal operation. These link rods are slightly inclined forwards, that is to say towards the main transmission box, so that pivoting them backwards (having disconnected the means of connection between the output shaft of the engine and the input shaft of the main transmission box) will, by raising the engine slightly, allow the engine's legs 25, 26 and 26' to come onto their respective rails, so that the engine can be slid backwards. For this, the connecting rods may pivot as their ends are connected to clevis mounts 32 on the deck P and the clevis mounts (not depicted in FIG. 7) on the engine cradle, by means of bolts 33 which act as pivot pins, and this allows these connecting rods to be detached from the engine when the engine needs to be completely removed. The two connecting rods 29, 29' are also inclined inwards, so that they point more or less towards the centre of gravity of the engine, and this allows them to make an effective contribution to taking up forces (engine weight) Fy and Fz, as described earlier.

Now that the structure of an installation in accordance with the invention has been described, it will be understood how it can be used quickly and easily in various envisagable maintenance operations; removal followed by re-fitting of the engine M; removal followed by re-fitting of the main transmission box.

Only the operation of removing the engine M will be described hereinbelow, by way of an illustrative example, with reference to FIGS. 8 and 9.

FIG. 8 shows again, on a smaller scale, an installation similar to the one in FIG. 6 after the flared half tube 11 and the flared tube 14 of the engine have been disconnected from one another by unscrewing the studs 18, this operation having been followed by a slight backwards movement of the engine M and a tilting of the link rods 29, 29' backwards to make the engine rest via its legs on the three rails on the deck. All of these operations can be carried out by just one person; maintenance hand-holds or areas marked on the engine making the engine easier to manipulate (it should be noted that prior to these operations, a temporary chock was placed under the central leg 25). The next operation is to remove the bolts 33 that attach the link rods 29, 29' to the engine, the engine may if necessary be disconnected from all its circuits and it is moved fully back by sliding it along the rails into the position depicted in FIG. 9. Note that if the connections that connect the engine M to the aircraft are flexible and long enough, the engine can be moved back without these having to be disconnected.

The engine can now be worked on, in situ if possible, or removed using lifting gear.

The engine is re-fitted by carrying out the same operations in the reverse order, theoretically involving two operators, if the engine has been removed.

The operations of removing the main transmission box are carried out in a similar way: placing a temporary chock under the central leg 25 of the engine; removing the attachment studs 23 (see FIG. 5); tilting the engine M on its link rods 29, 29' and placing its legs on the three rails of the deck P; disconnecting the link rods; moving the engine M back until it comes up against the stop. The transmission shaft 1 can then be disconnected from the main transmission box by unscrewing the studs 8 (see FIG. 1). Here too, the re-fitting operations are carried out in a similar way to the removal operations, but in the reverse order.

It should be noted that by using link rods which relatively speaking are longer (than those depicted in the drawing), it may in some cases be possible for the engine to be moved back far enough, for example for overhaul operations, without the link rods needing to be disconnected; this would represent an additional time saving.

We claim:

1. An installation for mounting an engine on a deck, and for connecting an output shaft of said engine to at least one driven mechanism, said output shaft being connected to at least one input shaft of said at least one driven mechanism, said installation comprising connection means for connecting said output shaft and said at least one input shaft together, and means for attaching the engine to the decks wherein said connection means comprise a transmission shaft which has a certain amount of flexural flexibility and at least one splined end having a sliding fit in a corresponding splined hub of at least one member selected from the group consisting of the engine and said at least one driven mechanism, wherein said connection means comprise legs for standing the engine on the deck, a system for articulated attachment between the engine and the deck, and rails fixed to the deck parallel to said at least one input shaft and said output shaft and wherein said legs can slide with the engine after tilting.

2. An installation according to claim 1, wherein said transmission shaft has a rigid central section, one end of which is connected to said at least one splined end and another end of which is connected to a flanged end section and being fixed to a corresponding flange of a flanged hub of said at least one driven mechanism of the engine, and wherein said at least one flexible coupling device is inserted between one end of said rigid central section of said transmission shaft and said at least one splined end and/or its flanged end section.

3. An installation according to claim 2, in which a first stationary and projecting protective flared tube surrounds an end of said output shaft of the engine and in which a second stationary and protective flared tube surrounds an end of said at least one input shaft, wherein said first and second stationary and projecting protective flared tubes are connected by an intermediate flared tube surrounding said transmission shaft and fixed at the outer ends to said first and second stationary and projecting protective flared tubes, and wherein said intermediate flared tube comprises two flared half tubes the internal ends of which are joined together by a cardan joint.

4. An installation according to claim 3, wherein at least one of said first and second stationary and projecting protective flared tubes has a set of guide spigots over which corresponding holes of a flange provided at an outer end of the corresponding flared half tube can engage, wherein said flange may be fixed by screws to said outer end of said at least one of said first and second stationary and projecting protective flared tubes.

5. An installation according to claim 3, wherein at least one of said first and second stationary and projecting protective flared tubes has a guide spigot and an axial bore for centering, in which an end centering device that projects from a flange provided at an outer end of the corresponding flared half tube can engage, wherein said flange may be fixed by screws to said outer end of said at least one of said first and second stationary and projecting protective flared tubes.

6. An installation according to claim 1, in which a first stationary and projecting protective flared tube surrounds an end of said output shaft of the engine and in which a second stationary and projecting protective flared tube surrounds an end of said at least one input shaft of the mechanism, wherein said first and second stationary and projecting protective flared tubes are connected by an intermediate flared tube surrounding said transmission shaft and fixed at the outer ends to said first and second stationary and projecting protective flared tubes, and wherein said intermediate flared tube comprises two flared half tubes the internal ends of which are joined together by a cardan joint.

7. An installation according to claim 6, wherein at least one of said first and second stationary and projecting protective flared tubes has a set of guide spigots over which corresponding holes of a flange provided at an outer end of the corresponding flared half tube can engage, wherein said flange may be fixed by screws to said outer end of said at least one of said first and second stationary and projecting protective flared tubes.

8. An installation according to claim 6, wherein at least one of said first and second stationary and projecting protective flared tubes has a guide spigot and an axial bore for centering, in which an end centering device that projects from a flange provided at an outer end of the corresponding flared half tube can engage, wherein said flange may be fixed by screws to said outer end of said at least one of said first and second stationary and projecting protective flared tubes.

9. An installation according to claim 1, wherein legs consist of a central leg and two lateral legs spaced axially away from said central leg, wherein said rails on said deck consist of three rails corresponding to said legs, and wherein at least two of said rails are guiding slideways for the corresponding legs.

10. An installation according to claim 9, wherein said system of articulated attachment comprises at least two link rods which can be secured, by removable pins, between clevis mounts on the deck and corresponding clevis mounts on the body of the engine, said at least two link rods being arranged laterally and directed at least approximately towards an axis of the engine and, when they occupy their normal static position, furthermore being inclined axially slightly towards said driven mechanism.

* * * * *